(12) United States Patent
Janky et al.

(10) Patent No.: US 7,546,135 B2
(45) Date of Patent: Jun. 9, 2009

(54) EXTENDED ADDRESSING FOR A DIGITAL TRUNKED RADIO SYSTEM

(75) Inventors: William Oscar Janky, Goode, VA (US); Eugene H. Peterson, III, Forest, VA (US)

(73) Assignee: M/A-COM Private Radio Systems, Inc., Lynchberg, VA (US)

( * ) Notice: Subject to any disclaimer, the term of this patent is extended or adjusted under 35 U.S.C. 154(b) by 1341 days.

(21) Appl. No.: 10/117,901

(22) Filed: Apr. 8, 2002

(65) Prior Publication Data

US 2003/0190923 A1     Oct. 9, 2003

(51) Int. Cl.
*H04B 7/00*     (2006.01)
(52) U.S. Cl. ........................ 455/520; 455/518; 455/519; 455/521
(58) Field of Classification Search .............. 455/426.1, 455/524, 507, 509, 9, 33.1, 54.1, 516–521, 455/450
See application file for complete search history.

(56) References Cited

U.S. PATENT DOCUMENTS

| | | | | |
|---|---|---|---|---|
| 4,905,302 A | * | 2/1990 | Childress et al. | 455/515 |
| 4,939,746 A | * | 7/1990 | Childress | 455/509 |
| 5,077,828 A | * | 12/1991 | Waldroup | 455/514 |
| 5,125,102 A | * | 6/1992 | Childress et al. | 455/9 |
| 5,212,724 A | * | 5/1993 | Nazarenko et al. | 455/560 |
| 5,530,916 A | * | 6/1996 | Schultz | 455/518 |
| 5,797,097 A | * | 8/1998 | Roach et al. | 455/456.2 |
| 5,864,762 A | * | 1/1999 | Childress et al. | 455/509 |
| 5,956,648 A | | 9/1999 | Brennan et al. | 455/518 |
| 6,006,099 A | * | 12/1999 | Rondeau et al. | 455/462 |
| 6,374,115 B1 | * | 4/2002 | Barnes et al. | 455/520 |
| 6,519,472 B1 | * | 2/2003 | Brennan et al. | 455/518 |
| 6,577,874 B1 | * | 6/2003 | Dailey | 455/521 |
| 6,671,517 B1 | * | 12/2003 | Lin et al. | 455/518 |

OTHER PUBLICATIONS

East Central Florida Scanning Page, http://home.cfl.rr.com/sanner/trunk.htm.*

* cited by examiner

*Primary Examiner*—Edward Urban
*Assistant Examiner*—Raymond S Dean

(57) ABSTRACT

A method for reliable communication within a digital trunked radio system having a digital control channel and a plurality of working channels, wherein said working channels are assigned for temporary use by a subset of radio units by digital control signals transmitted over said control channel, said control channel carrying outbound digital control signals from a base site to said radio units, said outbound digital control signals having a fixed transmission time slot, said method comprising the steps of: (a) transmitting a first message and a second message, each 28 bits in length, within said time slot; (b) defining at least one first message type identifier field within said first message; (c) defining a group identifier in said first message, said group identifier comprising from greater than 11 up to 16 bits; (d) defining at least one second message type identifier field within said second message; (e) defining a logical identifier in said second message, said logical identifier comprising from greater than 14 up to 20 bits.

20 Claims, 5 Drawing Sheets

Message 1      201

| 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | |
|----|----|----|----|----|----|----|----|----|----|----|----|----|----|----|----|----|----|---|---|---|---|---|---|---|---|---|---|---|
| \| MT-1 | | | | | | | | | | | | | | | | | | | | | | | | | | | | MT-1 |
| 203 | | | | | ⌒ MT-2 | | | | | | | | | | | | | | | | | | | | | | | MT-2, or data |
| | | | 205 | x | x | x | x | x | x | x | x | x | x | x | x | x | x | x | x | x | x | x | x | x | x | x | x | Data |

Message 2      202

| 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | |
|----|----|----|----|----|----|----|----|----|----|----|----|----|----|----|----|----|----|---|---|---|---|---|---|---|---|---|---|---|
| MT-1 | | | | | | | | | | | | | | | | | | | | | | | | | | | | MT-1 repeat |
| x | x | x | x | x | x | x | x | x | x | x | x | x | x | x | x | x | x | x | x | x | x | x | x | x | x | x | x | Data |

FIG. 2a

| MT-1: | 00001 – TDMA Group Voice Channel Assignment |
|---|---|
| | 00010 – Group Data Channel Assignment |
| | 00011 – Digital Group Voice Channel Assignment |
| | 11111 – Use MT-2 |
| MT-2: | 0000 – Initiate Test Call Command |
| | 1101 – Serial Number Request |
| | 1111 – Undefined |

FIG. 2b

| MTA: | 0000 – Analog Group Call |
| --- | --- |
| | 0011 – Emergency Digital Group Call |
| | 1111 – Use MT-B |
| MTB: | 000 – Status Messages |
| | 001 – Special Call Request |
| | 111 – Use MT-D |
| Single Message MT-D: | 00000 – Undefined |
| | 01111 – System All-Call Request |
| Double Message MT-D: | 10000 – Individual Call Request (Msg. 1) |
| | 11111 – Undefined |

EXTENDED ADDRESSING FOR A DIGITAL TRUNKED RADIO SYSTEM

FIELD OF THE INVENTION

The present invention relates, in general, to digital trunked radio systems, and more specifically to a system for extended addressing for a digital trunked radio system.

BACKGROUND OF THE INVENTION

Digital trunked radio communication systems are commonly used by public service organizations, such as police, fire, and ambulance squads, and by many private organizations to communicate with each other. Digital trunked radio systems provide an efficient means to communicate between single users and/or groups of users. They allow for one call to be made to many users simultaneously, such as a police dispatcher sending out a call to a group of officers at once. Any officer receiving the call has the ability to respond to the dispatcher, as well as to all other officers in the group. This makes this type of communication system well suited for public safety and municipal applications.

Digital trunked radio systems operate by allowing a user to transfer a voice call (or data call) to another user or group of users on the system. The information is transferred on one of a plurality of channels, referred to as working channels. A control channel assigns a working channel to every transmission, and notifies both the transmitting radio and all receiving radios of the working channel assignment. When the transmission is completed, the assigned working channel is released, and thus becomes available for a new transmission.

Each radio on the system has a particular logical identifier (LID) that identifies it within the system. The LID identifies each radio to the system such that the system is aware of the origin of any transmission, similar to a caller ID function commonly used in the telephone industry. It also allows for a transmission to be sent to one particular radio. Further, it allows for a radio that has been lost or stolen to be removed from the system, so that an unauthorized person in possession of the lost radio cannot listen in on or interfere with the rest of the system.

In addition to having an individual LID, the various radios can be grouped together for more efficient communications by assigning group identifiers (GID). FIG. 1 illustrates a digital trunked radio system operating in a typical municipal environment containing several groups. For example, a municipality might use a digitally trunked radio system for many departments, including both the police department and fire department. Using a GID, the individual radios can be grouped into separate groups for dividing the radios used by the police officers and the radios used by the firemen. A dispatcher can send a message to all radios identified to be in the police officer group. A message is sent out over the control channel (which is monitored by all radios on the system) identifying the GID for the radios that the transmission is intended to reach (i.e., all police officers). Those radios change to the assigned working channel to receive the message, while all other radios ignore the communication on the control channel.

In addition, the groups can be further broken down into subgroups, if desired. For example, the police officers group might consist of patrollers and detectives. Using additional GIDs, the group of police officer radios can be divided into patroller radios and detective radios. This makes it possible for a dispatcher to send a transmission to only patrollers, or only detectives.

Currently, on some digital trunked radio systems, the LID and GID assignments are achieved using a relatively short binary address. For example, the Enhanced Digital Access Communication System (EDACS) by M/A-COM Private Radio Systems, Inc. (Lynchburg, Va.) uses a 14-bit binary code to provide each radio with an LID. This creates $2^{14}$ possible distinct LIDs, which allows for 16,384 radios to reside on the digital trunked system. EDACS also uses an 11-bit binary code to create various GID assignments, allowing for $2^{11}$ or 2,048 possible groups to exist within the system.

When digital trunked communication systems such as EDACS were first developed, very few users required more than 16,384 radios or 2,048 groups within a system. By keeping the LIDs and GIDs to a minimum number of bits, it was possible to transmit the information required to request a channel in short transmissions (30 millisec in EDACS) which allowed a large increase in system loading capacity over conventional radio systems and other competitive trunking systems. However, as these systems have been expanded to cover larger systems and wider areas (today often an entire state or several states), the need to have additional radios and additional groups on the same system has arisen. One possibility for adding more radios to a system is to increase the user address space and group address space to include more bits by defining a new timing structure to the transmission protocols. However, doing so has some drawbacks. By defining a new structure to the transmission protocol, it may not be possible to simply upgrade old radios to operate on the new system. In addition, increasing the length of the transmission protocol could result in a slower response time or lower loading performance. Current users of systems such as EDACS might need to replace their entire system once their requirements exceed the maximum 16,384 radios or 2,048 groups. This would require replacing many thousands of radios; thus, this is not a feasible solution for most existing users. For this reason, the digital trunked radio systems remained limited in the number of radios and groups that could be present on the system as a result of the bit limitations of the LIDs and GIDs in the communication protocol.

Existing digital trunked radio systems such as EDACS use a "Slotted Aloha" protocol for communication between radios and the base station. Slotted Aloha is well known in the art, and involves transmitting information in timed groups known as "slots" or "buckets." The standard bucket used by digital trunked radios systems such as EDACS is 30 msec in duration. This time frame equates to 288 bits of data using a standard 9600 baud rate.

A number of pieces of information are transmitted on the control channel within each bucket. Many bits are used for dotting and barker functions. Dotting allows the receiving radio to find the location of distinct bits (i.e., bit sync-ing) and barker messages allow for the receiving radio to determine the beginning of a transmitted message (i.e., word sync-ing). In addition to dotting and barker bits, information regarding channel assignment, group assignment, and individual radio identification are all transmitted within a bucket on the control channel. All of this information needs to be kept within 30 millisecond buckets in order to operate within the existing structure of the Slotted Aloha protocol used by the prior art radios currently in existence.

What is desired is a method of increasing available LID and GID addresses, while remaining within the same timing structure of the transmission protocols currently used by systems such as EDACS. In this manner, the systems could be expanded while still allowing for existing hardware to be programmed to function with the system. This would remove the need to replace existing components, while still allowing systems to be increased in size to larger than the current limitations on the number of radios and the number of groups.

SUMMARY OF THE INVENTION

The present invention is an extended addressing protocol for use with digital trunked radio systems that allows the maximum number of radios on a digital trunked radio system to be increased, and also allows the maximum number of groups within the system to be increased, while at the same time remaining consistent with the timing structure currently used by existing radios.

The preferred embodiment of the present invention increases the LID from 14 bits to 20 bits (corresponding to an increase in the number of individual radios on a system from 16,384 available in the prior art to 1,048,574 available on a system operating in accordance with the present invention), and increases the GID from 11 bits to 16 bits (corresponding to an increase in the number of groups available on a system from 2,048 available in the prior art to 65,534 available on a system operating in accordance with the present invention), while remaining within the standard protocol timing structure currently used by existing EDACS systems. This is achieved by modifying the structure of the messages sent over the control channel, while maintaining the form of the messages sent in compliance with the Slotted Aloha protocol using 30 msec buckets.

The timing structure used by existing EDACS systems allows for two independent messages to be present within a bucket on an outbound control channel transmission. The preferred embodiment of the present invention logically links the two messages contained within an outbound transmission together. By doing this, the amount of bits available to use for LID definition and GID definition is increased. This enables the size of the LID and the size of the GID to be increased, which allows for more radios and more groups within the system.

The preferred embodiment of the present invention also modifies the existing protocol of inbound transmissions. An entirely new message structure is used on the inbound messages in accordance with the present invention. All available bits within a bucket are used to convey the required channel information along with the increased LIDs and GIDs.

As a result of the linking of the two messages on the outbound transmissions and the use of all available bits on the inbound transmission, the opportunity for additional redundancy to improve reliability is reduced. To assure that the performance of the system remains at the levels desired, the control channel transmissions in accordance with the preferred embodiment of the present invention, both inbound and outbound, are subjected to an additional procedure not used in the prior art. An Exclusive-Or (XOR) process is applied to the messages on both transmission and receipt. Subjecting the transmissions to an XOR mask using a pseudo-random code reduces false messages and, thus, improves reliability.

BRIEF DESCRIPTION OF THE DRAWINGS

FIG. 2a is a bit diagram of an outbound control channel transmission.

FIG. 2b is a table of examples of items sent within an outbound control channel transmission.

DETAILED DESCRIPTION OF THE INVENTION

Figure 1:
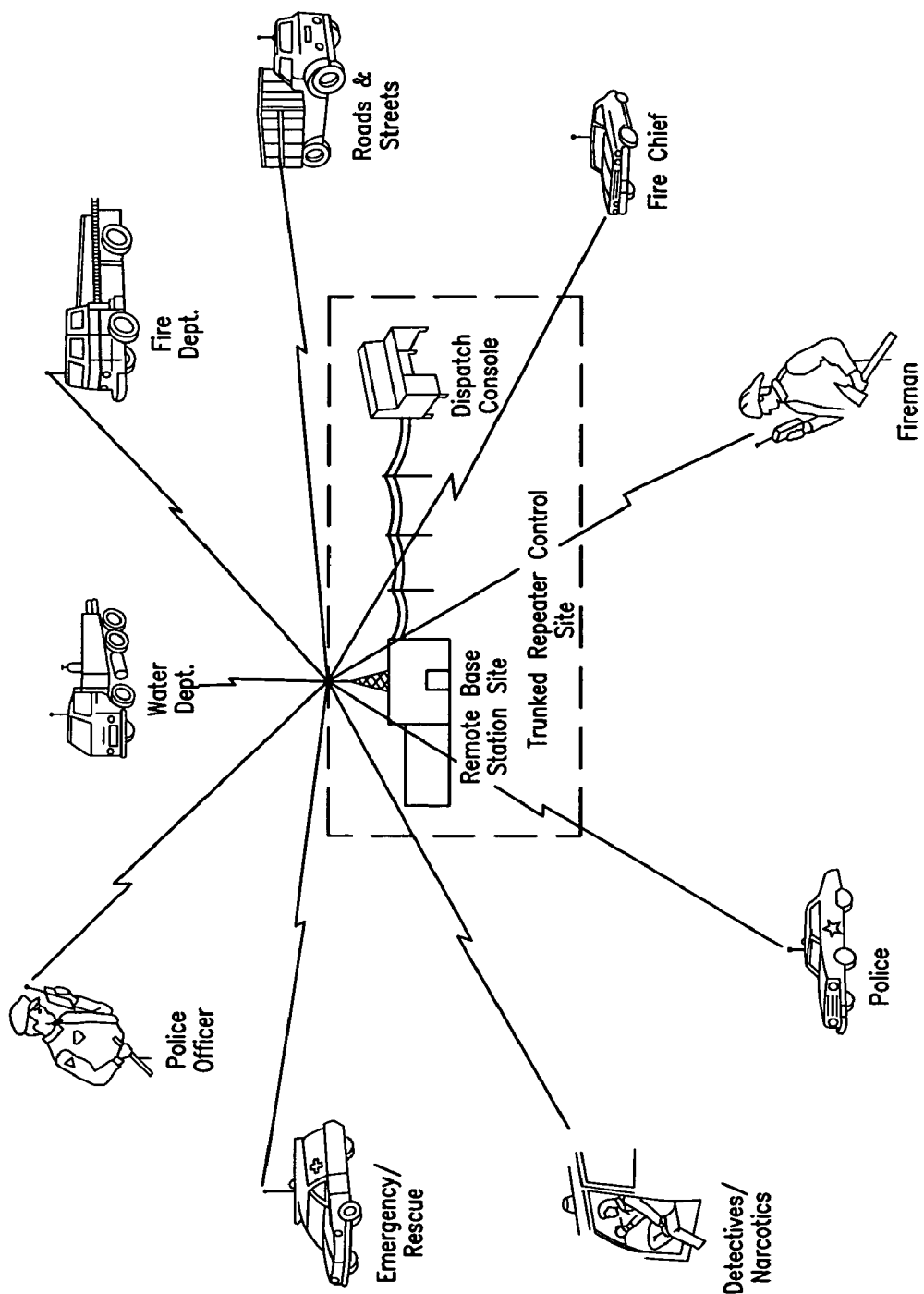
FIG. 1 is an illustration of a digital trunked radio system, such as EDACS, in accordance with the prior art.

The preferred embodiment of the present invention provides an extended addressing protocol for increasing the number of users and groups in a digital trunked radio communication system. For sake of example, the following description shall be set forth in connection with an EDACS radio system. However, it should be understood that the same technique can be applied to various other digital trunked radio communication systems.

The preferred embodiment increases the number of individual radio identifiers to 1,048,574 (from 16,384 currently available) and increases the number of group identifiers to 65,534 (from 2,048 currently available) on an EDACS digital trunked radio system. However, it should be understood that other embodiments of the present invention would provide for various levels of increased LIDs and GIDs, and such increased levels are not limited to the numbers used in the preferred embodiment.

The EDACS system, like all digital trunked radio communication systems, uses a plurality of working channels for voice and data communication, and a control channel for system management purposes (e.g., working channel assignment, radio identifier information, group identifier information). The EDACS system in accordance with the present invention uses the working channels in the same manner as the prior art systems; thus, no discussion of these channels is contained herein. The following description is limited to a detailed discussion of the techniques used to transmit information on the control channel.

Transmissions on the control channel can be classified into two distinct types according to their direction relative to the base station. For the purposes of this discussion, control channel transmissions from a base station to one or more radios shall be referred to as "outbound transmissions" and transmissions from a radio to a base station shall be referred to as "inbound transmissions."

Each outbound transmission on the control channel in accordance with the present invention consists of a combination of several frames of data. The data is sent in a stream of bits 30 msec in duration. This allows for the extended addressing technique in accordance with the present invention to operate within the standard slotted aloha protocol used in the prior art. Currently, EDACS systems transmit information in "slots" or "buckets" 30 msec in duration. The systems operate at 9600 baud, which results in 288 bits being contained within each bucket.

Each transmission begins with 16 bits of dotting. Dotting is a technique of transmitting alternating zeros and ones that are used to achieve bit synchronization, as known in the art. Following the initial dotting bits, a 16 bit field containing an extended 11 bit barker word along with five dotting bits is transmitted to allow the receiving radio to identify the beginning of a transmitted message (word synchronization). Using a barker message to achieve word synchronization is also well known in the art. Following the second 16 bit field, an additional 16 bit dotting field is sent.

Once the dotting and barker bits have been sent, the remaining bits are used to transmit the message. Each message is 40 bits in total length. These 40 bits are divided into 28 bits for the actual message content, plus an additional 12 bits required to perform a BCH error correction process, as is well known in the art. Twelve bits are used to perform the necessary BCH error correction upon the 28 bit message.

For outbound transmissions, two separate messages are sent in one bucket. Each of the two messages is sent in triplicate. The first message is transmitted as a stream of 40 bits (28 bit message+12 BCH bits), then the identical message is inverted and sent a second time, and then the message is again inverted (to return it to its initial state) and transmitted a $3^{rd}$ time. The second message is transmitted in triplication in the same manner. The RF environment is an inherently noisy environment, which results in many bit errors during transmission. For this reason, the message is transmitted with triple redundancy to assure accuracy of the transmitted data. The middle message transmission is inverted to avoid bit stream errors caused by sending too many bits of the same value in a row. After a message is received in triplicate, the receiving device will perform a voting process upon receipt. This is a process whereby each bit value is determined to be the value of at least two of the three corresponding bit values received.

In accordance with the present invention, the information content of the two 28 bit messages contained in each bucket is modified significantly over the system used in the prior art. In the prior art, the 28 bits contained within a single message were sufficient to convey group identifiers (GIDS) and logical identifiers (LIDs) in a single message. Thus, the two messages contained within a bucket could be completely independent of one another. However, when critical information was being sent, the two messages often are repeats of each other.

In order to increase the length of the GID and LID while leaving the bucket size unchanged, this protocol has been adjusted so that the two messages contained in an outbound transmission are now associated with one another. FIG. 2a illustrates the bit patterns used for the two messages contained within an outbound bucket. Each message is still a total of 28 bits in length. Referring to FIG. 2a, the bits of each message have been numbered 0 to 27 for reference. The bits within each message are divided according to function.

The field contained in the first five bits of the first message 201 contains the first of two message type identifiers (MT-1) 203. The MT-1 field is used to assign a working channel for the associated transmission. Examples of the type of information that can be found in MT-1 are listed in the table shown in FIG. 2b. For example, if MT-1 field 203 contains 00001, the assignment is for a working channel for a TDMA voice call.

In some cases, additional bits are required to convey all of the information required to be located in the message type identifier field. In such events, a second message type identifier (MT-2) 205 is used. The MT-2 field comprises the four bits following the MT-1 field within message one 201. There is no corresponding MT-2 field within message two 202. Examples of the type of information located in MT-2 are listed in the table shown in FIG. 2a. For example, a command to tell the radio to perform a test call on the specified working channel would be given by transmitting 11111 in MT-1 (indicating that the radio should look to MT-2 for more information) and 0000 in MT-2.

Sixteen of the remaining bits in message one 201 are used to designate a group identifier, or GID. This leaves 3 to 7 bits (depending upon whether MT-2 was necessary) remaining in message one 201 to send any other information usually sent on the control channel, such as call priority designation, emergency call designation, etc. However, there are not enough bits remaining in message one 201 to transmit logical identifiers, or LIDs. LIDs have been increased from the prior art state of 14 bits to 20 bits in accordance with the present invention. Thus, a separate message (message two 202) is necessary to transmit the required LID.

Message two 202 comprises a 28 bit format similar to message one 201. The initial five bits comprise a repeat of the MT-1 field; however, there is no MT-2 field used in message two 202. The remaining open bits in message two 202 are used to transmit LID information, which is 20 bits in length in accordance with the preferred embodiment of the present invention. Three bits are unused, or used for other information such as call designation.

The RF environment is subject to a well known phenomena called "fading." Fading is a group or burst of bit errors resulting from reflections of signals off of things in the environment. Because of fading, a particular message can contain a group of errors so numerous that the message is incomprehensible. In the prior art, critical information (primarily group assignments) was transmitted twice within a bucket, using message one and message two as repeats of each other. The protocol used in accordance with the present invention no longer permits this additional redundancy, as the two messages are logically linked to convey all of the necessary information.

Both message one 201 and message two 202 are required to transmit all of the information desired via the control channel. This is a significant difference from the method used in the prior art, whereby one message within a bucket could be unrelated to the second message. It provides a significant advancement by allowing larger LIDs and GIDs; however, by linking the function of the two messages together in accordance with the preferred embodiment of the present invention, the ability to repeat the message in both message one and message two to create further redundancy is lost. It is now necessary to receive both messages, each transmitted one time, in order to receive the information that could have been transmitted in one message that could be repeated twice. As a result, in the preferred embodiment of the present invention, additional modifications to the transmissions have been made to assure that there is no degradation to the system performance.

In order to remedy this concern in the extended addressing protocol in accordance with the present invention, the information contained with the two related messages is prioritized. Critical information such as channel assignment and group assignment is contained in message one 201. The individual radio identifier (LID) is contained in message two 202. By placing the more critical information in message one 201, the system can operate effectively in situations where only message one is received and an error occurs within message two. In such an event, the less critical information such as the LID is re-conveyed once the radios have switched to a working channel; thus, the system does not suffer in performance. In this manner, only message one must be received for the system to function. This is closer to the condition which existed in the prior art in that only one message is necessary; however, in the prior art it could be either of the two messages, where in the extended addressing protocol in accordance with the present invention, it must be the first message.

Figure 3A:
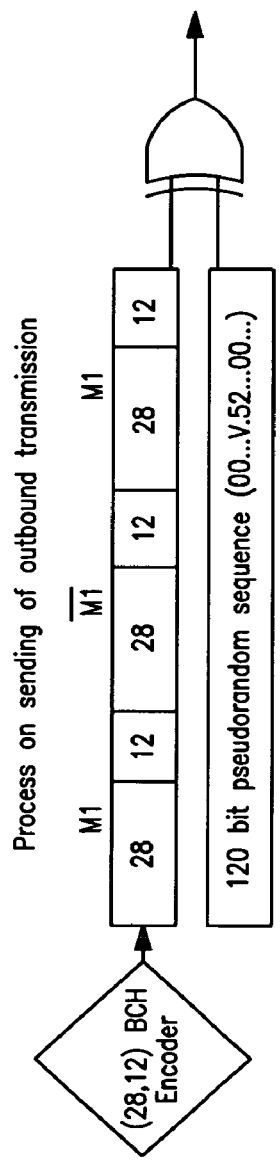
FIG. 3a is a logical diagram of the Exclusive-Or (XOR) process performed on an outbound message prior to sending.
Figure 3B:
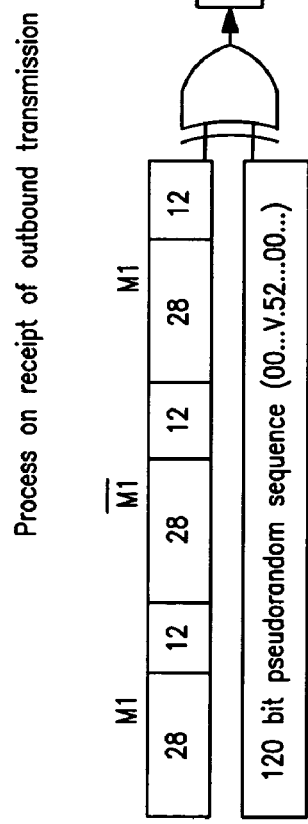
FIG. 3b is a logical diagram of the Exclusive-Or (XOR) process performed on an outbound message upon receipt by a radio.

Because of the potential for additional errors created by the requirement that message one must be received in order for the system to function, the outbound transmission is modified performed to improve reliability. FIG. 3a and FIG. 3b depict the process applied to the transmission both when the transmission is sent and again upon receipt at the radio. An exclusive-or process (XOR) is applied to the message upon transmission using a pseudo-random pattern generated using a V.52 random generator as shown in FIG. 3a. The pattern consists of zeros in all 28 bits corresponding to the bits of message contents, and the random pattern is applied to the 12 bits used for BCH error correction. Upon receipt, the XOR function is again applied to the message, as shown in FIG. 3b. The result is to break up the cyclic nature of BCH encoding/decoding process. It is well known in the art that BCH error correction codes are affected by bit slipping. Bit slipping is the insertion or deletion of a bit, causing the code word to be shifted by one bit. Because of the nature of BCH coding, the bit slip frequently results in a different yet valid code word, which can cause the intended message to be misinterpreted. The use of the XOR function upon transmission and receipt alters the BCH codeword in such a manner that any bit slipping will result in an invalid BCH codeword that can be recognized as invalid by the receiving radio. This will reduce the possibility of false message transmission, and thus improve reliability. The ability to perform the XOR function can be programmed into existing hardware; thus, there is no need to replace existing hardware.

The inbound control channel transmissions have also been redefined in accordance with the present invention. In order to remain in compliance with the existing EDACS time constraints (Slotted Aloha with 30 millisecond buckets), the inbound transmissions are limited in length to 276 bits. A total of 288 bits can be sent in 30 msec at a transmission speed of 9600 baud; however, it is possible to have up to a 12 bit skew in data on an inbound transmission as a result of propagation delays. Thus, the inbound channel messages consist of 276 bits.

The initial 54 bits are used for dotting, and the next 48 bits provide word synchronization. There is only one message contained within a bucket on the inbound control channel. The message is 40 bits in length, with an additional 18 bits used for BCH error correction, yielding a total of 58 bits used for the message. Similar to the technique used on the outbound channel, the 58 bit message is sent in triplicate, with the middle message transmission inverted for the same reasons as discussed above with reference to the outbound transmissions. Thus, the total transmission comprises 54 bits of dotting, 48 bits of word synchronization, and three 58 bit messages for a total of 276 bits.

Figures 4A, 4B:
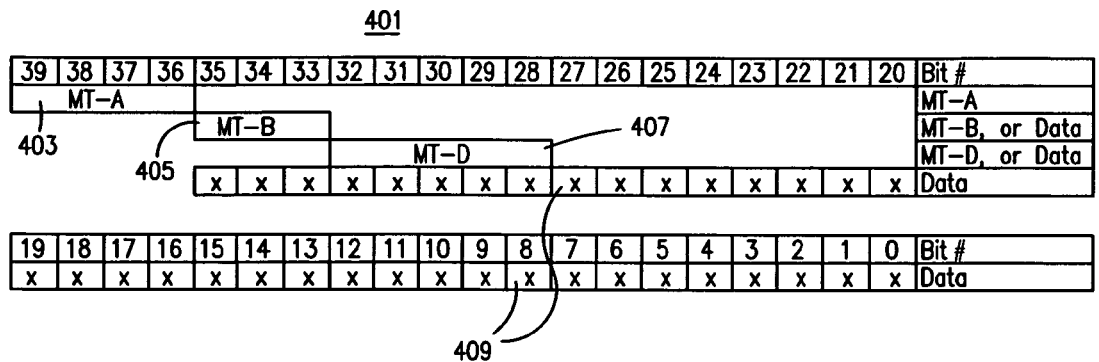
FIG. 4a is a bit diagram of an inbound control channel transmission.
FIG. 4b is a table of examples of items sent within an inbound control channel transmission.

The message structure within each 40 bit message 401, as shown in FIG. 4, comprises one or more initial message type fields followed by 28 to 36 data bits. The message type fields used with an inbound message contain information similar to what has previously been described as contained in the message type fields on an outbound message. Examples are shown in the table in FIG. 4a. Depending upon the type of call, only the MT-A field 403 may be required, or the MT-B field 405 may also be necessary, or the MT-A (403), MT-B (405) and MT-D (407) fields may all be necessary.

Following the message type fields, 28 to 36 data bits 409 are sent. Within these bits, information such as call priority, group identifiers, and logical identifiers are transmitted. An inbound transmission is essentially a request from a radio to the host for a channel assignment. Thus, the message does not need contain channel assignment information. Because of the increase in the length of the GIDs and LIDs in accordance with the present invention, the message type for an inbound message that needs to include both a group identifier and a logical identifier is defined by solely the MT-A field. This is because the remaining 36 bits are needed to transmit a 16 bit GID and a 20 bits LID in accordance with the present invention. The final 20 bits in the preferred embodiment are always used to transmit the LID of the sending radio; thus, in situations where any other information (e.g., priority information) is required, the call destination is limited to that assigned in the message type field instead of using the 16 bit GID.

Figure 5A:
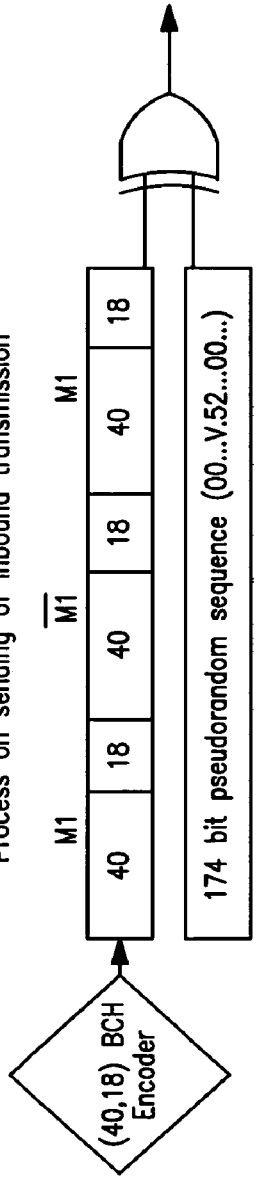
FIG. 5a is a logical diagram of the Exclusive-Or (XOR) process performed on an inbound message upon before transmission by a radio.
Figure 5B:
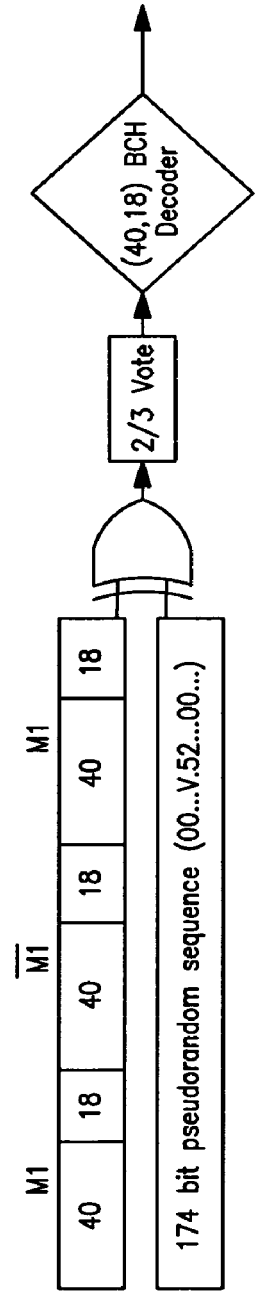
FIG. 5b is a logical diagram of the Exclusive-Or (XOR) process performed on an inbound message upon receipt at the base station.

The 18 bit BCH messages transmitted on the inbound channel are subjected to the same XOR process on transmit and receive as described above for the outbound control channel transmissions. A logical diagram illustrating the process on transmission is shown in FIG. 5a, and a logical diagram illustrating the process upon receipt is shown in FIG. 5b. As with the outbound messages, this process will reduce the possibility of false message transmission by reducing sensitivity to bit slipping, and thus improve reliability.

Reliability is further increase as a result of using 18 BCH error correcting bits. A forty bit message with 18 BCH bits is of higher performance than a 28 bit message using 12 BCH bits. This modification helps allow a system using the extended addressing protocol in accordance with the present invention to meet or exceed the performance levels of prior art systems.

By modifying the transmission protocol in an EDACS trunked radio system in accordance with the present invention, the total number of radios that can be included in a single system is increase to over one million radios. In addition, the total number of groups within one system is increased to over sixty-five thousand. These numbers exceed any projected need by digital trunked radio systems for many years. The present invention accomplishes this increase without changing the structure of the transmission protocol. This allows existing radios to be programmed to operate on a system using the extended addressing techniques in accordance with the present invention. This provides a great savings to users of existing systems who need to increase their system's capacity.

It should be understood that the foregoing is illustrative and not limiting and that obvious modifications may be made by those skilled in the art without departing from the spirit of the invention. Accordingly, the specification is intended to cover such alternatives, modifications, and equivalence as may be included within the spirit and scope of the invention as defined in the following claims.

What is claimed is:

1. A method for reliable communication within a digital trunked radio system having a digital control channel and a plurality of working channels, wherein said working channels are assigned for temporary use by a subset of radio units by digital control signals transmitted over said control channel, said control channel carrying outbound digital control signals from a base site to said radio units, said outbound digital control signals having a fixed transmission time slot, said method comprising the steps of:

a transmitting a first message and a second message, each 28 bits in length, within said time slot;

b defining at least one first message type identifier field within said first message;

c defining a group identifier in said first message wherein said group identifier is only contained in said first message, said group identifier comprising from greater than 11 up to 16 bits;

d defining at least one second message type identifier field within said second message;

e defining a logical identifier in said second message wherein said logical identifier is only contained in said second message, said logical identifier comprising from greater than 14 up to 20 bits.

2. A method as set forth in claim 1, wherein said transmission time slot is 30 milliseconds.

3. A method as set forth in claim 1, wherein a total of 288 bits are transmitted in said transmission time slot.

4. A method as set forth in claim 1, wherein the digital trunked radio system is an EDACS system.

5. A method as set forth in claim 1, wherein said at least one message type identifier is used to assign a working channel from said plurality of working channels.

6. A method as set forth in claim 1, further comprising the step of:

combining said first 28 bit message and said second 28 bit message with first and second twelve bit BCH error correction codes, respectively, to form first and second 40 bit messages.

7. A method as set forth in claim 6, further comprising the step of:

processing said first 40 bit message and said second 40 bit message by performing an exclusive-or function with a psuedoramdom code, wherein said code is comprised of zero value bits corresponding to the initial 28 bits and a random code corresponding to said 12 bit BCH error correction code.

8. A method as set forth. in claim 7, further comprising the step of:

transmitting said first 40 bit message and said second 40 bit message in triplicate.

9. A method as set forth in claim 8, wherein the digital trunked radio system is an EDACS system.

10. A method for reliable communication within a digital trunked radio system having a digital control channel and a plurality of working channels, wherein said working channels are assigned for temporary use by a subset of radio units by digital control signals transmitted over said control channel, said control channel carrying inbound digital control signals from said radios to a base site, said inbound digital control signals having a fixed transmission time slot, said method comprising the steps of:

a transmitting a message 40 bits in length within said time slot, said message being devoid of a channel assignment identifier;

b defining at least one message type identifier field within said message;

c defining a group identifier in said message, said group identifier comprising greater than 11 up to 16 bits;

d said control channel carrying outbound digital control signals from a base site to said radio units, said outbound digital control signals having a fixed transmission time slot;

e transmitting a first message and a second message, each 28 bits in length, within said time slot;

f defining at least one first message type identifier field within said first message;

g defining a group identifier in said first message wherein said group identifier is only contained in said first message, said group identifier comprising up to 16 bits;

h defining at least one second message type identifier field within said second message; and i defining a logical identifier in said second message wherein said logical identifier is only contained in said second message, said logical identifier comprising up to 20 bits.

11. A method as set forth in claim 10, further comprising the step of:

defining a logical identifier in said message, said logical identifier comprising up to 20 bits.

12. A method as set forth in claim 10, wherein said transmission time slot is 30 milliseconds.

13. A method as set forth in claim 10, wherein a total of 276 bits are transmitted in said transmission time slot.

14. A method as set forth in claim 10, further comprising the step of:

combining said 40 bit message with a BCH error correction code.

15. A method as set forth in claim 14, wherein said BCH error correction code comprises an 18 bit code, resulting in a 58 bit message after said combining step.

16. A method as set forth in claim 15, further comprising the step of:

processing said 58 bit message by performing an exclusive-or function with a psuedoramdom code, wherein said code is comprised of zero value bits corresponding to the initial 40 bits and a random code corresponding to said 18 bit BCH error correction code.

17. A method as set forth in claim 1, wherein said first message contains a second identifier indicating that additional information is being transmitted in said second message.

18. A method as set forth in claim 1, wherein said group identifier comprises 16 bits and said logical identifier comprises 20 bits.

19. A method as set forth in claim 10, wherein said group identifier comprises 16 bits.

20. A method as set forth in claim 11, wherein said logical identifier comprises 20 bits.

* * * * *